US011939813B2

(12) United States Patent
Lin

(10) Patent No.: US 11,939,813 B2
(45) Date of Patent: Mar. 26, 2024

(54) SLAT TILT MECHANISM FOR WINDOW COVERINGS

(71) Applicant: Whole Space Industries LTD, Taipei (TW)

(72) Inventor: Tzu-Yen Lin, Taipei (TW)

(73) Assignee: Whole Space Industries LTD, Taipei (TW)

( * ) Notice: Subject to any disclaimer, the term of this patent is extended or adjusted under 35 U.S.C. 154(b) by 704 days.

(21) Appl. No.: 17/155,164

(22) Filed: Jan. 22, 2021

(65) Prior Publication Data

US 2021/0140230 A1 May 13, 2021

Related U.S. Application Data

(62) Division of application No. 15/659,943, filed on Jul. 26, 2017, now Pat. No. 10,975,618.

(51) Int. Cl.
*E06B 9/307* (2006.01)
*E06B 9/32* (2006.01)
*E06B 9/28* (2006.01)

(52) U.S. Cl.
CPC ................ *E06B 9/307* (2013.01); *E06B 9/32* (2013.01); *E06B 2009/285* (2013.01)

(58) Field of Classification Search
CPC ... E06B 9/78; E06B 9/32; E06B 9/307; E06B 2009/285
USPC .................................................. 439/353, 357
See application file for complete search history.

(56) References Cited

U.S. PATENT DOCUMENTS 1,823,229 A * 9/1931 Balbaud .................. A44B 5/02 24/108
2,580,253 A * 12/1951 Stuber ..................... E06B 9/307 160/176.1 R
2,599,884 A * 6/1952 Bennett .................. E06B 9/307 160/176.1 R
2,709,488 A * 5/1955 Lorentzen ............... E06B 9/303 160/176.1 R
2,832,943 A * 4/1958 Cutler ....................... F16B 7/22 403/364
3,425,479 A * 2/1969 Abate ..................... E06B 9/305 160/176.1 R
3,560,908 A * 2/1971 Dell et al. ............ H01R 13/743 439/353
3,626,429 A * 12/1971 Toder ..................... A47H 13/00 24/669

(Continued)

*Primary Examiner* — Daniel P Cahn
*Assistant Examiner* — Shiref M Mekhaeil
(74) *Attorney, Agent, or Firm* — Buchanan Ingersoll & Rooney PC

(57) ABSTRACT

A window covering includes a tilt mechanism positionable in a first rail. The tilt mechanism includes a tilt shaft gear, a control gear, and a wand connector. An upper end of the wand connector has a hole in communication with a channel defined in a body of the wand connector such that a central projection of the control gear is insertable into the wand connector via the hole and the channel. A plurality of protrusions extend from the body of the wand connector around a periphery of the body of the wand connector. Each of the protrusions can have an upper surface configured to contact a respective one multiple prongs that extend from the control gear to engage the prongs to facilitate a direct connection of the wand connector to the control gear.

20 Claims, 5 Drawing Sheets

(56) References Cited

U.S. PATENT DOCUMENTS 3,918,513 A * 11/1975 Englund ................. E06B 9/324 160/176.1 R
3,921,695 A * 11/1975 Debs ....................... E06B 9/322 74/435
4,214,622 A * 7/1980 Debs ....................... E06B 9/361 160/176.1 R
4,245,687 A * 1/1981 Vecchiarelli ............ E06B 9/307 160/177 R
4,255,007 A * 3/1981 Michaels ............... H01R 24/38 439/295
4,262,725 A 4/1981 Debs
4,262,728 A * 4/1981 Debs ....................... E06B 9/362 160/176.1 R
4,386,644 A * 6/1983 Debs ....................... E06B 9/361 160/176.1 V
4,406,319 A * 9/1983 McNiel ..................... E06B 9/32 160/177 R
4,507,831 A * 4/1985 McClure ................... F16D 3/16 403/287
4,522,245 A * 6/1985 Anderson ............... E06B 9/307 160/177 R
4,541,468 A * 9/1985 Anderson ............... E06B 9/307 160/177 R
4,607,974 A * 8/1986 Brothers ................... E06B 9/76 74/544
4,621,672 A * 11/1986 Hsu ......................... E06B 9/307 160/176.1 R
4,628,979 A * 12/1986 Hsu ........................... E06B 9/32 160/176.1 R
4,676,292 A * 6/1987 Valle ....................... E06B 9/307 160/176.1 R
4,719,955 A * 1/1988 Tachikawa .............. E06B 9/324 160/176.1 R
4,848,435 A * 7/1989 Helver .................... E06B 9/364 160/176.1 R
4,875,516 A * 10/1989 Marocco ................... E06B 9/36 464/30
4,947,921 A * 8/1990 Chun-Cheng ........... E06B 9/307 160/176.1 R
4,955,248 A * 9/1990 Lindstrom ................ E06B 9/32 160/176.1 R
5,002,113 A * 3/1991 Georgopoulos ........ E06B 9/307 160/176.1 R
D317,290 S * 6/1991 Inaba ........................... D13/146
5,038,843 A * 8/1991 Sommerfeld ........... E06B 9/361 160/175
5,092,387 A * 3/1992 King ....................... E06B 9/303 160/176.1 R
5,143,135 A * 9/1992 Kuhar ..................... E06B 9/322 160/176.1 R
5,186,229 A * 2/1993 Hsu .......................... A47H 5/00 160/176.1 R
5,297,608 A * 3/1994 Rap ......................... E06B 9/307 160/177 R
5,309,950 A * 5/1994 Bassi ....................... D03C 3/40 24/616
5,389,007 A * 2/1995 Reinelt .............. H01R 13/6273 439/350
5,396,945 A * 3/1995 Meyer ..................... E06B 9/322 160/177 R
5,485,874 A * 1/1996 Whitmore ............... E06B 9/303 160/178.3
5,501,116 A * 3/1996 Weng ........................ F16H 1/16 74/425
5,553,649 A * 9/1996 Chisaka .................... E06B 9/76 160/176.1 R
5,560,414 A * 10/1996 Judkins ................... E06B 9/262 16/442
5,603,371 A * 2/1997 Gregg ..................... E06B 9/307 160/DIG. 17
5,636,677 A * 6/1997 Liu ......................... E06B 9/361 160/177 R
5,636,678 A * 6/1997 Carper ....................... F16F 1/14 16/DIG. 7
5,749,405 A * 5/1998 Huang .................... E06B 9/326 160/168.1 R
5,749,406 A * 5/1998 Benthin .................. E06B 9/364 160/177 V
5,819,832 A * 10/1998 Huang .................... E06B 9/307 160/168.1 R
5,845,695 A * 12/1998 Cadorette ............... E06B 9/368 160/177 V
5,850,863 A * 12/1998 Huang .................... E06B 9/326 160/176.1 R
6,044,889 A * 4/2000 Liu ......................... E06B 9/327 160/172 R
6,044,890 A * 4/2000 Renee ..................... E06B 9/303 160/178.1 R
6,176,290 B1 * 1/2001 Hsu ......................... E06B 9/322 160/115
6,196,293 B1 * 3/2001 Lee ......................... E06B 9/303 160/168.1 V
6,308,764 B1 * 10/2001 Lin ......................... E06B 9/322 160/177 R
6,318,439 B1 * 11/2001 Matsubara .............. E06B 9/307 160/115
6,325,133 B1 * 12/2001 Lin ......................... E06B 9/322 160/177 R
6,382,867 B2 * 5/2002 Serre ..................... F16B 21/073 403/329
6,425,432 B1 * 7/2002 Gross ...................... E06B 9/307 160/176.1 R
6,431,248 B1 * 8/2002 Hyman ..................... E06B 9/32 160/243
6,536,503 B1 * 3/2003 Anderson ............... E06B 9/322 242/375.3
6,786,270 B2 * 9/2004 Wen ........................ E06B 9/322 192/92
6,805,186 B1 * 10/2004 Nien ....................... E06B 9/322 160/177 R
D507,141 S * 7/2005 Allsopp ......................... D6/580
D509,394 S * 9/2005 Allsopp ......................... D6/580
7,308,927 B2 * 12/2007 Lai .......................... E06B 9/303 160/173 R
7,426,954 B2 * 9/2008 Bohlen ................... E06B 9/362 160/177 V
7,503,794 B2 * 3/2009 Haller .................. H01R 13/633 439/357
8,561,667 B1 * 10/2013 Hanley ..................... E06B 9/42 160/173 R
8,851,148 B2 * 10/2014 Lin ........................... E06B 9/40 160/174 R
8,910,696 B2 * 12/2014 Wen ........................ E06B 9/307 160/177 R
9,187,951 B2 * 11/2015 Yu ............................. E06B 9/90
9,284,774 B2 * 3/2016 Yu ........................... E06B 9/322
9,376,859 B1 * 6/2016 DeWard .................. E06B 9/323
9,528,318 B2 * 12/2016 Huang .................... E06B 9/262
9,657,517 B2 * 5/2017 Huang ...................... E06B 9/32
9,765,864 B2 * 9/2017 Yu ............................. E06B 9/78
9,879,475 B2 * 1/2018 Mullet ................. G05B 19/042
11,371,282 B2 * 6/2022 Chen ................... F16H 57/0025
2003/0192652 A1 10/2003 Song et al.
2006/0260765 A1 * 11/2006 Antonini ................. E06B 9/323 160/168.1 R
2007/0107855 A1 * 5/2007 Bohlen ..................... E06B 9/36 160/178.1 V
2007/0251653 A1 * 11/2007 Liu ......................... E06B 9/322 160/177 R
2008/0023157 A1 * 1/2008 Ganzi ..................... E06B 9/323 160/176.1 R
2008/0099161 A1 * 5/2008 Liu ......................... E06B 9/307 160/177 R
2012/0298317 A1 * 11/2012 Huang .................... E06B 9/303 160/170
2013/0048233 A1 2/2013 Lin
2013/0220561 A1 * 8/2013 Yu ............................. E06B 9/78 160/405

(56) References Cited

U.S. PATENT DOCUMENTS

| | | | | |
|---|---|---|---|---|
| 2014/0290876 | A1* | 10/2014 | Chen | E06B 9/322 160/170 |
| 2014/0311686 | A1* | 10/2014 | Yu | E06B 9/68 160/84.02 |
| 2017/0022754 | A1* | 1/2017 | Nien | E06B 9/307 |
| 2017/0175438 | A1* | 6/2017 | Nicolosi | E06B 9/307 |
| 2017/0362887 | A1* | 12/2017 | Lin | E06B 9/322 |
| 2018/0274290 | A1* | 9/2018 | Chen | E06B 9/306 |
| 2018/0363709 | A1* | 12/2018 | Chen | F16H 1/16 |
| 2019/0003252 | A1* | 1/2019 | Huang | E06B 9/322 |
| 2019/0032401 | A1* | 1/2019 | Hong | E06B 9/307 |
| 2019/0040676 | A1* | 2/2019 | Mullet | E06B 9/322 |
| 2021/0164291 | A1* | 6/2021 | Chen | F16H 57/039 |
| 2022/0186555 | A1* | 6/2022 | Hung | E06B 9/322 |
| 2022/0228431 | A1* | 7/2022 | Chen | E06B 9/322 |

* cited by examiner

SLAT TILT MECHANISM FOR WINDOW COVERINGS

CROSS-REFERENCE TO RELATED APPLICATIONS

The present application is a divisional application of U.S. patent application Ser. No. 15/659,943, which was filed on Jul. 26, 2017.

FIELD OF INVENTION

The present innovation relates to window coverings. For example, the present innovation relates to window coverings, tilt mechanisms for window coverings, mechanisms utilized to help facilitate the shipping, installment and use of window coverings, tilt mechanisms for controlling the positions of the slats for venetian blinds, and methods of utilizing such window coverings and/or mechanisms.

BACKGROUND OF THE INVENTION

Window coverings can be configured so that a material is moveable to partially or fully cover a window. Window coverings such as venetian blinds can utilize slats that are tiltable. Examples of such window coverings can be appreciated from U.S. Pat. Nos. 9,376,859, 8,910,696, 6,325,133, 6,308,764, 5,396,945, 5,186,229, 5,092,387, 5,002,113, 4,955,248, 4,522,245, 4,507,831, 3,921,695, and 2,580,253 and U.S. Patent Application Publication Nos. 2013/0220561 and 2013/0048233. But, such tilt mechanisms can often be bulky and require relatively expensive methods for packaging or shipping blinds having such mechanisms.

SUMMARY OF THE INVENTION

I have determined that a new window covering design is needed that can permit effective adjustment of window covering material while also permitting a retailer, fabricator, or manufacturer to make, package, and ship the window covering and also permitting a user to more easily and properly install and use the window covering. In some embodiments, the window covering can be configured as a cordless window covering that does not have any exposed operator cord. In other embodiments, the window covering can include exposed lift cords or an exposed operator cord (e.g. a loop cord for a loop cord drive, lift cords extending out of a cord lock, an operator cord coupled to lift cords extending out of a cord lock, etc.). I have also provided a tilt mechanism for such a window covering. The tilt mechanism could be provided with the window covering or as a kit for fabrication or assembly of a window covering. Methods of making and using embodiments of these innovations are also provided herein.

In some embodiments, a window covering includes a first rail and a tilt mechanism positioned in the first rail. The tilt mechanism includes a tilt shaft within the first rail configured to be attached to rails of ladders configured to positionably retain slats so that the slats are tiltable from between an open position to at least one closed position and a tilt shaft gear having an aperture. A portion of the tilt shaft can be within the aperture of the tilt shaft gear such that rotation of the tilt shaft gear causes the tilt shaft to rotate. The tilt mechanism can also include a control gear positioned adjacent the tilt shaft gear such that rotation of the control gear causes the tilt shaft gear to rotate. An upper end of the control gear can have at least one tooth. A lower end of the control gear opposite the upper end of the control gear can define a coupling mechanism having a plurality of prongs that extend around a central projection. The tilt mechanism can also include a wand connector having an upper end and a lower end opposite the upper end. The upper end of the wand connector can have a hole in communication with a channel defined in a body of the wand connector such that the central projection is insertable into the wand connector via the hole and the channel. A plurality of protrusions can extend from the body of the wand connector around a periphery of the body of the wand connector. Each of the protrusions can be configured to have an upper surface configured to contact a respective one of the prongs to resiliently move the prongs away from the central projection as the central projection is inserted into the body of the wand connector. Each of the protrusions can be configured to have a bottom surface configured to contact a portion of a respective one of the prongs after a distal end of the prong is passed over the upper surface of the protrusion to interlock with an upper flat portion of the prong.

In some embodiments, the coupling mechanism of the control gear can be configured so that after the coupling mechanism is attached to the wand connector via the central projection being positioned within the body of the wand connector and the prongs engaging the bottom surfaces of the protrusions, at least one of the prongs must be fractured to separate the control gear from the wand connector.

Embodiments of the window covering can also include other elements. For instance, the window covering can include at least one lift cord control mechanism positioned in the housing; and at least one lift cord connected to the lift cord control mechanism. In some embodiments, the lift cord control mechanism can be configured as a motor, a spring motor, a cord lock, or a loop cord drive. Each lift cord can be a cord, a cord segment, a polymeric filament, tape, or other type of elongated flexible member. Each lift cord can extend from the first rail through slats. A second rail can be positioned below the slats and a lower terminal end of each lift cord can be connected to the second rail. The slats of the window covering may be part of or the entirety of the window covering material of the window covering. The slats may be positioned to be held via the first rail via a plurality of ladders. Each of the ladders can have spaced apart rails and rungs that extend between the rails. The upper ends of the rails can be connected to the tilt shaft so that the rungs are tiltable for tilting of the slats between an open position and one or more closed positions.

Embodiments of the window covering can also include a tilt wand that is connectable to the lower end of the wand connector. The tilt wand can be positioned below the first rail.

Embodiments of the tilt mechanism can also include at least one intermediary gear positioned between the tilt shaft gear and the control gear. The one or more intermediary gears may couple the tilt shaft gear to the control gear so that rotation of the control gear causes the tilt shaft gear to rotate. In other embodiments, one or more teeth of the tilt shaft gear can be enmeshed with at least one tooth of the control gear (e.g. one or more teeth of a worm gear of the control gear defined on the control gear's upper end, a profile that is defined on the upper end of the control gear for engaging teeth of the tilt shaft gear, etc.) so that rotation of the control gear causes the tilt shaft gear to rotate.

Some embodiments of my method can include a method of providing a window covering. Such a method can include a number of different steps. For instance, one exemplary embodiment of such a method can include providing a tilt mechanism that is positionable in a first rail of a window covering. The tilt mechanism can include a tilt shaft gear having an aperture so that a portion of a tilt shaft is passable through the tilt shaft gear via the aperture of the tilt shaft gear such that rotation of the tilt shaft gear causes the tilt shaft to rotate when the tilt shaft gear is within the aperture and a control gear positioned adjacent the tilt shaft gear such that rotation of the control gear causes the tilt shaft gear to rotate. An upper end of the control gear can have at least one tooth, a lower end of the control gear opposite the upper end of the control gear can define a coupling mechanism having a plurality of prongs that extend around a central projection. The tilt mechanism can also include a wand connector having an upper end having a hole in communication with a channel defined in a body of the wand connector such that the central projection is insertable into the wand connector via the hole and the channel. A plurality of protrusions can extend from the body of the wand connector around a periphery of the body of the wand connector. Each of the protrusions can be configured to have an upper surface configured to contact a respective one of the prongs to resiliently move the prongs away from the central projection as the central projection is inserted into the body of the wand connector. Each of the protrusions can be configured to have a bottom surface configured to contact a portion of respective one of the prongs after a distal end of the prong is passed over the upper surface of the protrusion to interlock with an upper flat portion of the prong. Embodiments of this method can also include the steps of passing the central projection into the hole of the upper end of the wand connector to insert the central projection into the channel, causing the prongs to engage the protrusions to resiliently move the prongs away from the central projection, and interlocking the bottom surfaces of the protrusions with upper surfaces of distal ends of the prongs after the prongs are passed lowest ends of the upper surfaces of the protrusions to affix the wand connector to the control gear.

In some embodiments of the methods, the coupling mechanism of the control gear can be configured so that after the coupling mechanism is attached to the wand connector via the central projection being positioned within the body of the wand connector and the prongs interlocking with the bottom surfaces of the protrusions to affix the wand connector to the control gear, at least one of the prongs must be fractured to separate the control gear from the wand connector.

Embodiments of the method can also include other steps. For instance, embodiments of the method can include shipping the tilt mechanism to a customer (e.g. a retailer, fabricator, or end user), positioning the tilt mechanism within the first rail of the window covering, passing a portion of the tilt shaft through the aperture of the tilt shaft gear, positioning a lift cord control mechanism in the first rail, connecting at least one lift cord to the lift cord control mechanism, connecting upper ends of rails of ladders to the tilt shaft, passing each lift cord through or adjacent the slats, and providing a tilt wand with the window covering that is connectable to the lower end of the wand connector such that rotation of the tilt wand causes the tilt shaft to rotate. Embodiments of the method can also include the steps of placing the tilt wand and the window covering in a package, and shipping the window covering with the tilt wand such that the tilt wand is separate from the wand connector when in the package. In some embodiments, the method can be configured so that the tilt wand and the window covering are placed in a package such the wand connector is coupled to the tilt wand or the tilt wand and wand connector are each separate from the control gear and are separately positioned in the package. For such embodiments, only a portion of the tilt mechanism may be provided in the first rail when the first rail is included in the package as at least the wand connector can be separately provided in the package. After a customer receives the package, the customer may insert the wand connector into the first rail and into a housing of the tilt mechanism within the first rail for coupling to the control gear.

Other details, objects, and advantages of the window covering, window covering positional adjustment mechanism, and methods of making and using the same will become apparent as the following description of certain exemplary embodiments thereof proceeds.

BRIEF DESCRIPTION OF THE DRAWINGS

Exemplary embodiments of the window covering, window covering material tilt mechanism, and methods of making and using the same are shown in the accompanying drawings. It should be understood that like reference numbers used in the drawings may identify like components.

DETAILED DESCRIPTION OF EXEMPLARY EMBODIMENTS

Figure 1:
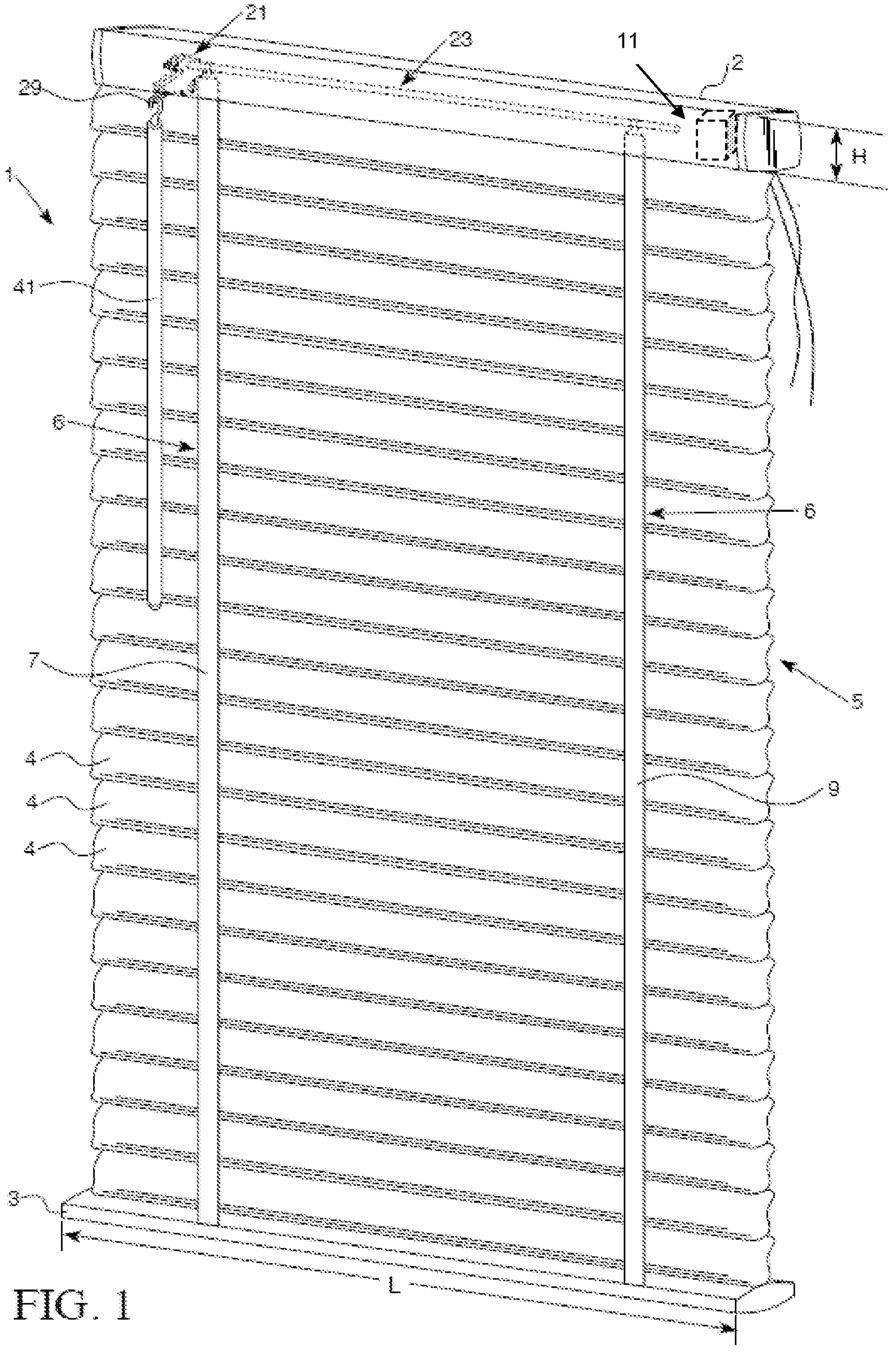
FIG. 1 is a perspective view of a first exemplary embodiment of my window covering with slats of the window covering material in a first open tilted position.
Figure 2:
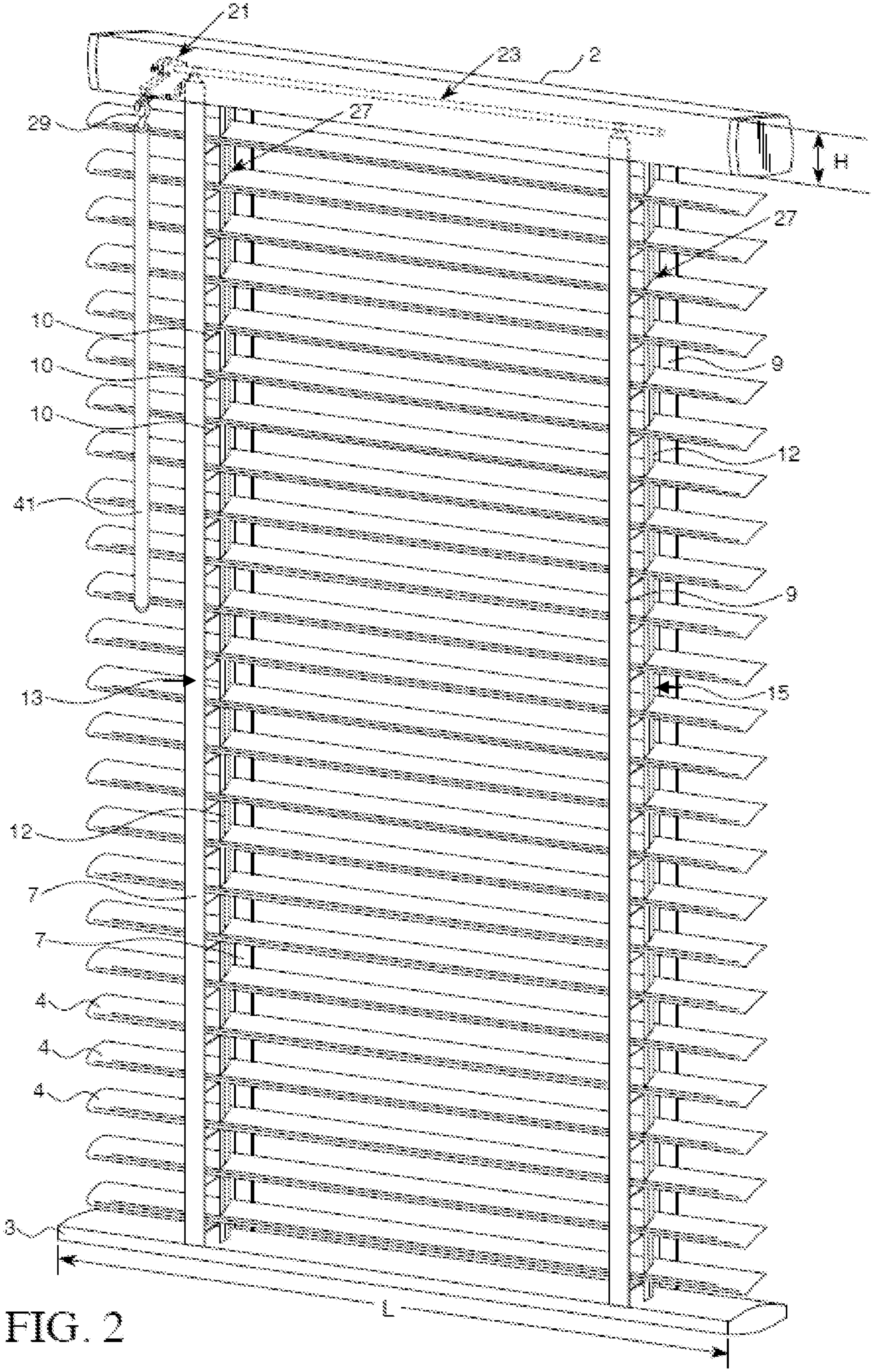
FIG. 2 is a perspective view of the first exemplary embodiment of my window covering with slats of the window covering material in a second closed tilted position.
Figure 3:
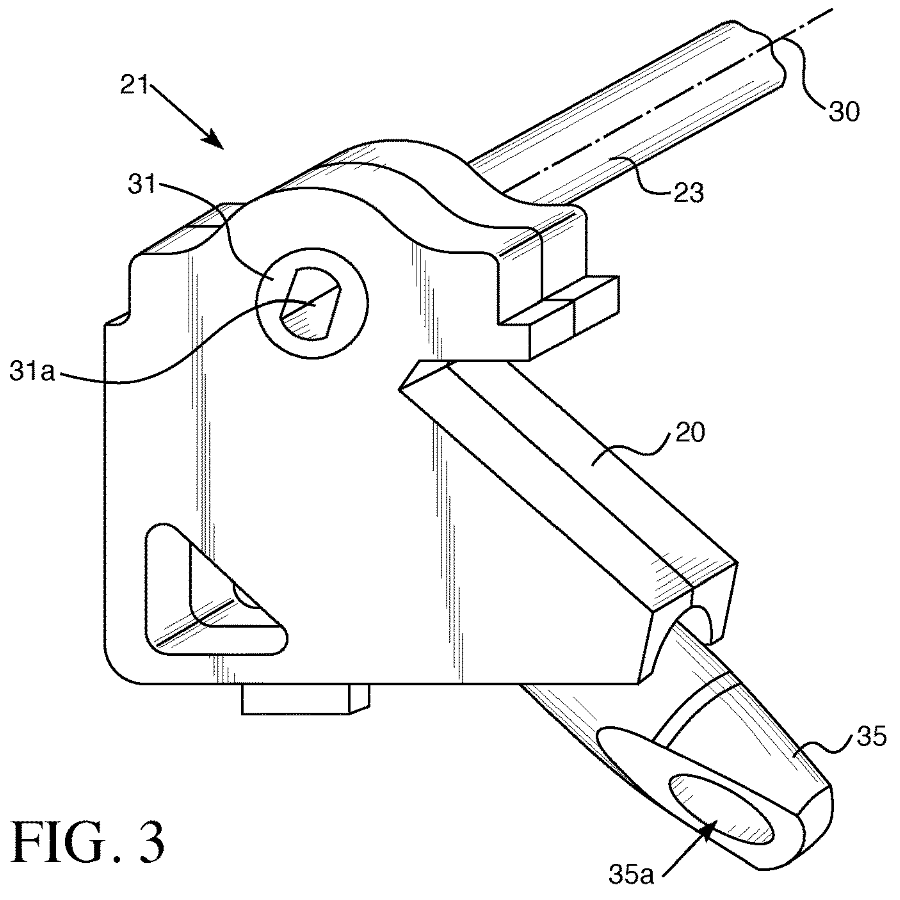
FIG. 3 is a perspective view of an exemplary embodiment of the tilt mechanism of the first exemplary embodiment of my window covering.
Figure 4:
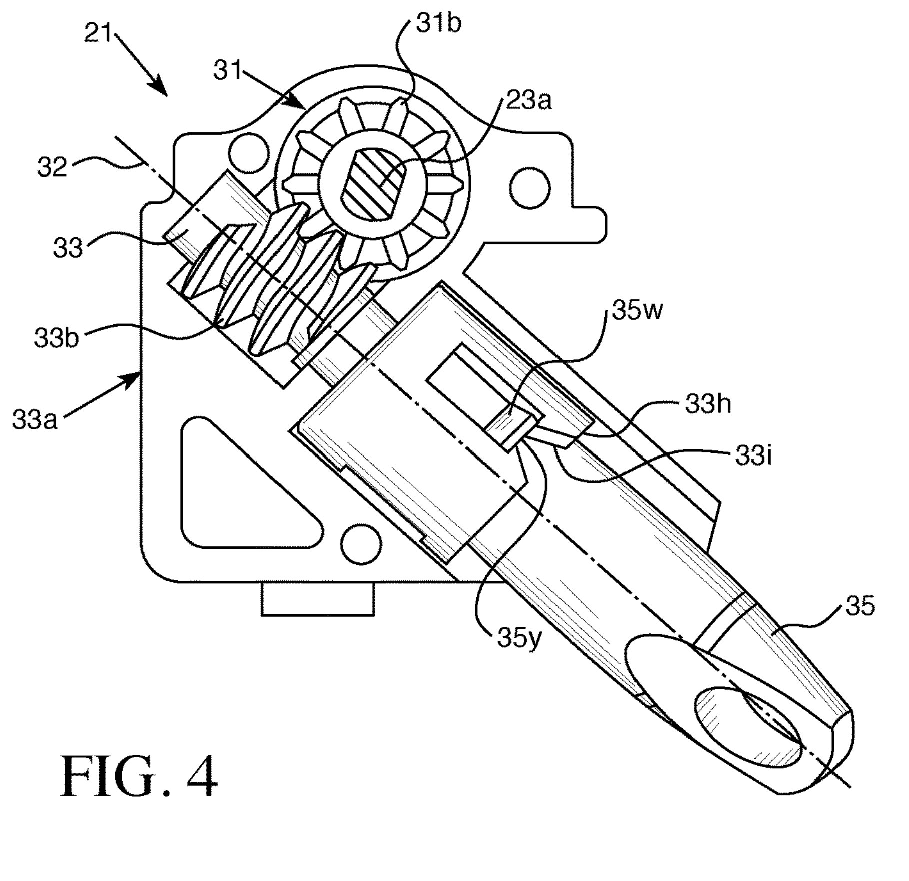
FIG. 4 is a cross sectional view of the exemplary embodiment of the tilt mechanism of the first exemplary embodiment of my window covering.
Figure 5:
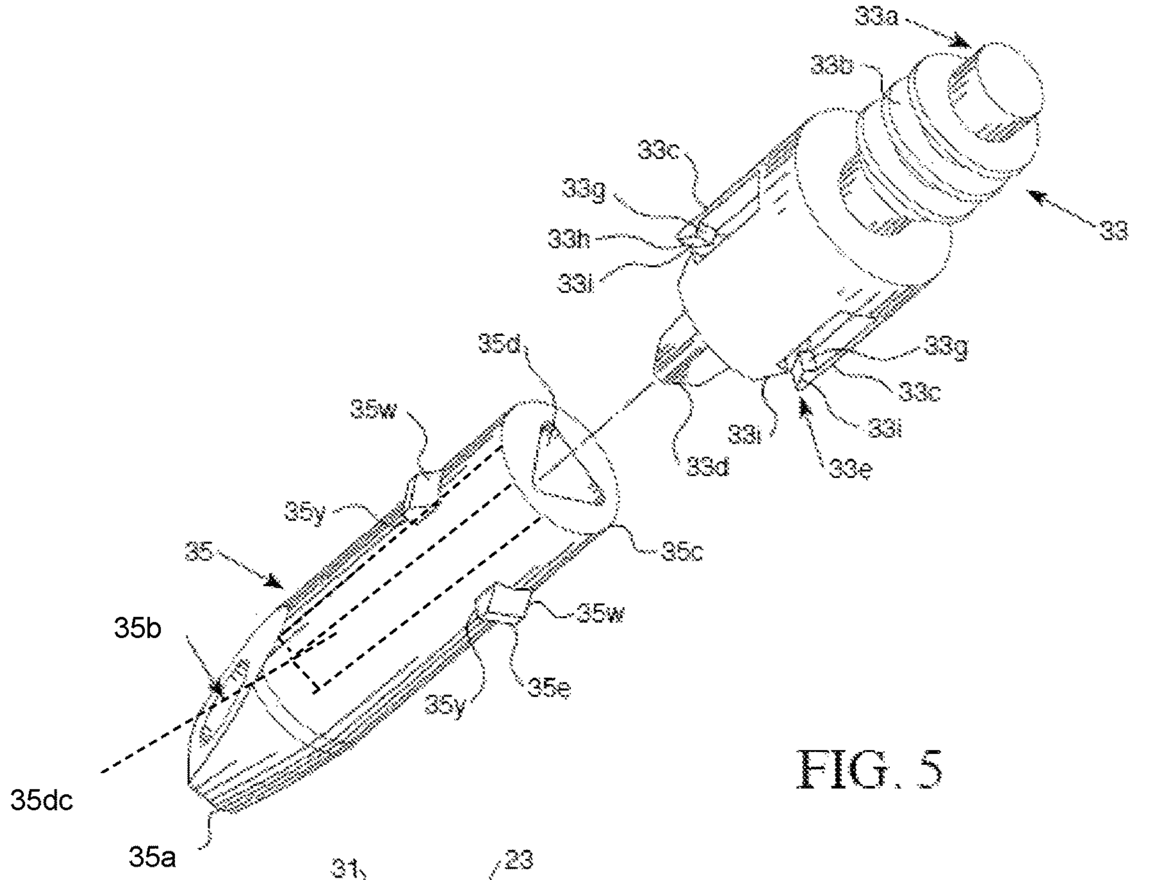
FIG. 5 is n exploded view of a multi-piece connector assembly of the exemplary embodiment of the tilt mechanism shown in FIGS. 3 and 4.
Figure 6:
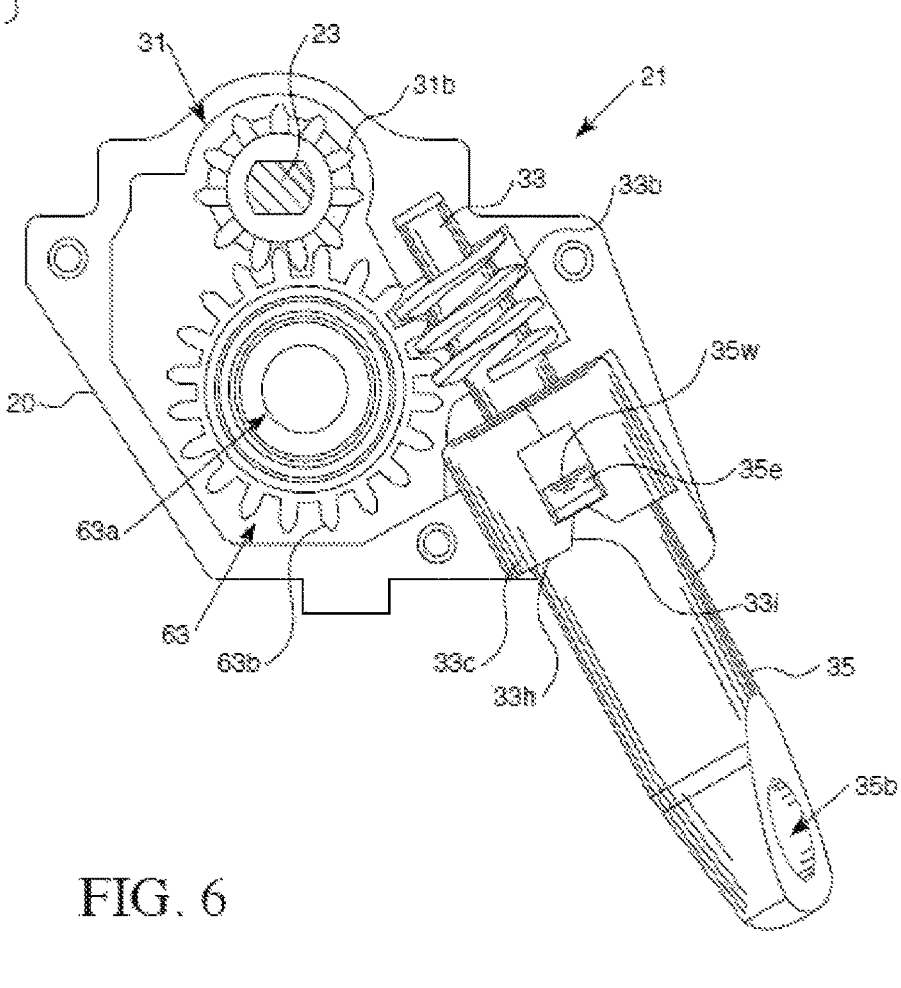
FIG. 6 is a cross sectional view of similar to FIG. 4 of an alternative exemplary embodiment of the tilt mechanism that can be utilized in exemplary embodiments of my window covering.
Figure 7:
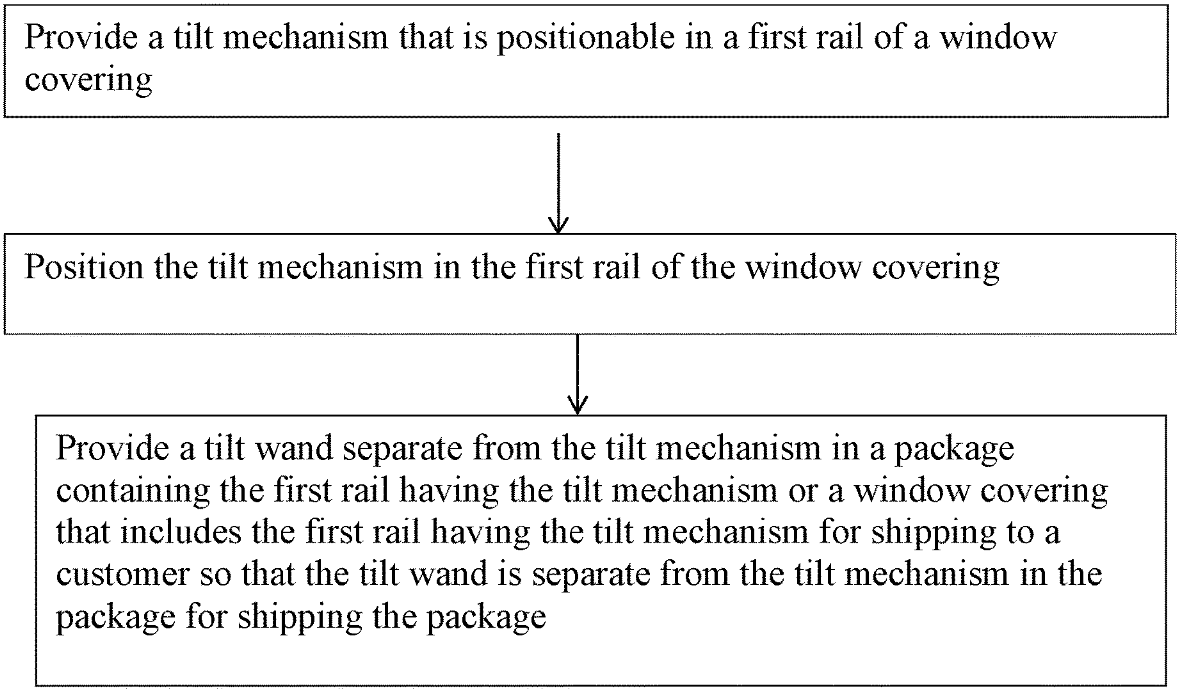
FIG. 7 is a flow chart illustrating an exemplary method of providing a window covering.

As can be appreciated from FIGS. 1-7, embodiments of my window covering 1 can include a first rail 2, window covering material 5 that is connected to the first rail 2 such that the window covering material is moveable from between a fully extended, or lowered position and a fully retracted, or raised position. Lift cords 12 can be coupled to a lift cord control mechanism 11 (shown within the first rail 2 in broken line in FIG. 1) attached to the first rail 2. The lift cords 12 can extend through the window covering material 5 to a second rail 3 or to a bottom portion of the window covering material 5. For instance, the lift cords can pass through holes 27 defined in the slats 4 of the window covering material, pass along front or rear edges of the slats, or can otherwise extend through the window covering material 5.

The lift cords 12 are operatively connectable to the lift cord control mechanism so that the lift cord control mechanism is able to control the extent to which the window covering material is lowered or raised. For instance, the lift cord control mechanism 11 can be coupled to the lift cords 12 via one or more pulleys and/or a rotatable shaft to control the motion of the lift cords and/or the position of the lift cords to permit the window covering material to be retracted or extended and to retain the position of the window covering material at a user desired position (e.g. fully retracted, fully extended, partially extended, etc.). The lift cord control mechanism 11 can be configured as a spring motor unit, an electric motor, a cord lock, or other type of control mechanism that is connectable to the lift cords 12 to control the motion of the lift cords 12 so that the position of the window covering material 5 can be controlled via actuation of the lift cord control mechanism 11.

The first rail 2 can be configured as a headrail or as the middle rail of a top down bottom up shade. The second rail 3 can be configured as a bottom rail.

The window covering material 5 can include slats 4. Each of the slats 4 can be retained on respective rungs 10 of spaced apart ladders 6 that are connected to the first rail 2. For instance, each slat 4 may be held or retained on a respective rung 10 of a first ladder 13 and a respective rung 10 of a second ladder 15 that is spaced apart from the first ladder 13. The rungs 10 of the first ladder 13 can be spaced apart from each other and extend between first rails 7 of the first ladder 13. The rungs 10 of the second ladder 15 can be spaced apart from each other and extend between second rails 9 of the second ladder 15. The rungs 10 of the ladders that retain a respective one of the slats 4 can be positioned to be parallel to each other so that each slat 4 can be positioned level or substantially level (e.g. within 0-2 degrees of being level or being within 0-10 degrees of being level).

Each ladder can be connected between the first rail 2 and the second rail 3 or connected between the first rail 2 and a bottommost slat 4. For instance, top ends of the first rails 7 can be attached to a tilt shaft 23 positioned in the first rail 2 and bottom ends of the first rails 7 can be connected to the bottom rail 3 or the bottommost slat. The top ends of the second rails 9 can be attached to the tilt shaft 23 positioned in the first rail 2 and the bottom rends of the second rails 9 can be connected to the second rail 3 or the bottommost slat The first and second rails 7 and 9 can be connected to the tilt shaft 23 such that rotation of the tilt shaft 23 causes the first and second rails 7 and 9 to move so that the rungs 10 are synchronously moveable between an inclined position, a horizontal position, and a declined position. The horizontal positions of the rungs 10 can correspond to the open position of the slats 4 shown in FIG. 2 and the inclined and declined positions can correspond to fully closed tilted positions of the slats 4 or partially tilted closed positions of the slats 4. When in the horizontal positions, the rungs 10 may extend horizontally or substantially horizontally between the rails of the ladders (e.g. horizontal, within 2 degrees of horizontal, or within 5 degrees of horizontal). When in a declined or inclined position, the rungs 10 may extend at an inclined or declined angles such that a front end of each rung 10 is positioned above or below the rear end of the rung 10 so that the run extends linearly at an incline or a decline (e.g. between 10 and 90 degrees relative to horizontal, between 10 and 80 degrees relative to horizontal, or between 10 and 65 degrees relative to horizontal, etc.).

The tilting of the slats 4 can be effected by a slat tilt mechanism 21 that is positioned in the first rail 2 and is connected to the tilt shaft 23. As may best be appreciated from FIGS. 3-5, the tilt mechanism 21 can include a housing 20 that encloses a tilt shaft gear 31. The tilt shaft gear 31 can have a central aperture defined therein that receives the tilt shaft 23 within the central aperture. For instance, an end 23*a* of the tilt shaft 23 or a portion of the tilt shaft 23 that may be positioned adjacent the end of the tilt shaft 23 can be received within the central aperture of the tilt shaft gear 31. The shape of the central aperture of the tilt shaft gear can be configured to interlock with the shape of the tilt shaft received therein so that rotation of the tilt shaft gear 31 causes the tilt shaft to rotate in the same direction the tilt shaft gear rotates (e.g. the tilt shaft 23 rotates clockwise when the tilt shaft gear 31 is rotated clockwise and the tilt shaft 23 rotates counterclockwise when the tilt shaft gear 31 is rotated counter clockwise).

The tilt shaft gear 31 can have teeth 31*b* that extend from a body of the gear that defines the central aperture that receives the tilt shaft 23. The teeth 31*b* can matingly contact or matingly engage with one or more teeth 33*b* (e.g. at least one helical shaped projection that is defined along a central part of the control gear 33 adjacent an upper rear end 33*a* of the control gear) that extend from a control gear 33 so that rotation of the control gear 33 drives rotation of the tilt shaft gear 31. In some embodiments, the control gear 33 can be configured as a worm gear.

Rotation of the control gear 33 in a first rotational direction (e.g. clockwise or counterclockwise) can drive rotation of the tilt shaft gear 31 in a first rotational direction for rotating the tilt shaft 23. Rotation of the control gear 33 in a second rotational direction that is opposite the first rotational direction can drive rotation of the tilt shaft gear 31 in an opposite direction so that the tilt shaft 23 rotates in an opposite direction.

The axis 32 of rotation of the control gear 33 can be perpendicular or transverse to the axis 30 of rotation of the tilt shaft gear 31. For instance, the axis of rotation of the tilt shaft gear may be a horizontal axis that extends in a direction along the length L of the first rail 2 and the axis of rotation of the control gear 33 can extend in a direction along a height H of the first rail or at an inclined or declined angle (e.g. 30 degree, 45 degree, or 60 degree angle relative to the height H of the first rail) in a direction that is transverse or perpendicular to the direction at which the axis of rotation of the tilt shaft gear extends.

The control gear 33 can be positioned to extend in the housing 20 from adjacent a middle portion of the first rail 2 toward a front wall of the first rail 2. The control gear 33 may extend at an angle of inclination as it extends from adjacent the front of the first rail to the tilt shaft gear 31 so that its rear upper end 33*a* is above its lower second end that is opposite its rear upper end 33*a*. The lower second end of the control gear can be connected to a coupling mechanism such that the coupling mechanism is defined by the lower send end of the control gear 33 (e.g is an integral portion of the lower end defined via molding of the control gear from a metal or a polymeric material or otherwise forming of the control gear 33). The coupling mechanism can be defined on the lower second end of the control gear to include a central projection 33*d* that has a distal end that defines a terminal end of the second end of the control gear 33. This central projection 33*d* can be surrounded by spaced apart prongs 33*c* that are integral to the control gear and are positioned around a periphery of central projection. The prongs 33*c* can define a chamber 33*e* in which the central projection 33*d* is positioned. The central projection 33*d* may be spaced apart from the prongs 33*c* and extend out of the chamber 33*e* defined by the prongs 33*c* to be matingly received within a hole 35*d* defined in an upper end 35*c* of a wand connector 35 so that the central projection 33*d* can be slid through the hole 35*d* and slid within a channel in communication with the hole 35*d* in the body of the wand connector 35. The coupling mechanism that is defined by the lower second end of the control gear 33 can be configured to facilitate a direct connection of the control gear 33 to the wand connector 35 (e.g. no intervening part or fastener between the wand connector 35 and the control gear 33).

The wand connector 35 can have a body that has a plurality of spaced apart protrusions 35*e* defined or otherwise attached on an exterior peripheral surface thereon so that the protrusions extend away from the body of the wand connector 35. The protrusions 35*e* can extend away from the body of the wand connector such that each protrusion has an angled surface (e.g. inclined or declined upper surface) that can be configured so that the prongs 33*c* can contact the protrusions 35*e* when the central projection is passed into the hole 35*d* in the upper end of the wand connector so that the prongs 33*c* resiliently flex away from the protrusions 35*e* as the central projection 33*c* is inserted into the wand connector body via the hole 35*d*.

The hole 35*d* can be triangular shaped to mate with a triangular profile or cross-sectional shape of the central projection 33*d*. In other embodiments, the central projection 33*d* could have a different cross-sectional shape (e.g. rectangular, polygonal, oval, trapezoidal, etc.) and the shape of the upper hole 35*d* of the wand connector 35 can be correspondingly shaped for receiving the central projection 33*d* and permitting the central projection 33*d* to be slid into the body of the wand connector via the hole 35*d* and channel 35*dc* defined in the body of the wand connector 35*d* that is in communication with the upper hole 35*d* that has a corresponding shape for receiving the central projection 33*d*.

After the central projection 33*d* is passed sufficiently into the body of the wand connector 35 via the hole 35*d* (and channel in communication with the hole defined in the inner body of the wand connector 35), the prongs 33*c* can extend past the protrusions 35*e* further toward the lower end 35*a* of the wand connector 35 and resiliently move toward the body of the wand connector 35. A distal end of each prong 33*c* can be structured so that after the prong is past the lowest end of the upper prong contacting surface 35*w* of the protrusion 35*e*, the distal end of the prong contacts the protrusion 35*e* and is blocked from moving over the protrusion 35*e* to permanently lock the wand connector 35 to the control gear 33 via the prong 33*c*/protrusion 35*e* interlocks. The prongs 33*c* and protrusions 35*e* can be configured so that each respective protrusion interlocks with a respective one of the prongs 33*c* to provide the locking engagement between the control gear 33 and the wand connector 35 via the control gear coupling mechanism defined in the lower end of the control gear 33. After the prongs 33*c* so engage the protrusions 35*e*, the wand connector 35 may only be separable from the control gear 33 if the prongs 33*c* are broken. Such a fracture would require a new control gear 33 to fix the tilt mechanism 21.

Each of the prongs 33*c* can have a distal end that is generally triangularly shaped to include an upper flat portion 33*g* and a lower distal-most portion 33*h* that has a smaller cross-section than the upper flat portion 33*g*. Each prong 33*c* can be shaped to include a linearly extending smooth protrusion contacting surface 33*i* that extends from the upper flat portion 33*g* to the lower distal-most portion 33*h* that is configured to contact a prong contacting surface 35*w* that extends away from the body of the wand connector 35 linearly along a slanted angle (e.g. is a declined portion) to define a ramp that the prong 33*c* moves along to resiliently bend to move away from the body of the wand connector 35 and the central projection 33*d* when the central projection 33*d* is passed into the hole and into the body of the wand connector 35. The angle and linearly extending surfaces of the prong contacting surfaces 35*w* and the protrusion contacting surfaces 33*i* of the protrusion contacting distal portion of the prongs 33*c* can cooperate with each other to guide the prongs in this resilient motion away from the wand connector 35 and the central projection 33*d*.

Once the distal end of the prongs 33*c* are past the protrusions 35*e* and the lowest distal points of the prong contacting surfaces 35*w* of the protrusions 35*e*, the upper flat portions 33*h* can be configured to contact and/or engage with a prong blocking portions 35*y* of the protrusions 35*e* that define bottom surfaces of the protrusions 35*e* below lowest edges of the prong contacting surfaces 35*w* of the protrusions 35*e*. The interlock between the prong blocking portions 35*y* and the upper flat portions 33*g* of the prongs 33*c* can define or help define the affixed connection between the wand connector 35 and the control gear 33 provided via the central projection 33*d*, prongs 33*c*, upper hole 35*d* and protrusions 35*e*.

The lower end 35*a* of the wand connector 35 can have a hole 35*b* defined therein. The hole 35*b* of the lower end of the wand connector 35 can be configured to receive a connector 29 (e.g. a hook, etc.) attached to a tilt wand 41. The tilt wand 41 can be coupled to the lower end of the wand connector 35 via the hole 35*b* so that rotation of the tilt wand in a first rotational direction drives rotation of the wand connector 35 in a first direction, which drives rotation of the control gear 33 in a first rotational direction via its connection to the wand connector 35, which drives rotation of the tilt shaft gear 31 in a first rotational direction via its connection to at least one tooth of the control gear 33, which drives rotation of the tilt shaft 23 in a first rotational direction via the tilt shaft's connection to the tilt shaft gear via the central aperture of the tilt shaft gear 31. Rotation of the tilt wand 41 in a second rotational direction that is opposite the first rotational direction can cause an opposite rotation of the wand connector 35 via it connection to the tilt wand, which can cause an opposite rotation of the control gear 33 via the control gear's connection to the wand connector 35, which can cause an opposite rotation of the tilt gear 33 via its connection to the control gear 33, which can cause an opposite rotation of the tilt shaft 23. Such opposite rotations permit a user to manipulate the wand to rotate the wand in opposite directions to drive rotation of the tilt shaft 23 in opposite directions. Because the upper ends of the first and second rails 7 and 9 are coupled to the tilt shaft, rotation of the tilt shaft 23 in opposite directions effects adjustment of the orientation of the rungs 10 that extend between the first rails 7 and second rails 9 of the first and second ladders 13 and 15 so that the rungs 10 can be oriented from their horizontal positions to different tilted positions (e.g. inclined, declined, etc.). Such tilting can cause the slats retained on the rungs 10 via the ladders to be tilted from their open position to closed positions and partially closed positions.

In some embodiments, the tilt mechanism 21 can be configured to include at least one intermediary gear 63 between the tilt shaft gear 31 and the control gear 33. The intermediary gear 63 can be configured to permit the gear ratio between rotation of the tilt shaft gear 31 and the control gear 33 to be adjusted. This can allow for a more refined user control of the tilting of the slats (e.g. it takes more revolutions of the tilt wand to drive rotation of the tilt shaft 23) or a less refined user control of the tilting of slats (e.g. it takes less revolutions of the tilt wand 41 to rotate the tilt shaft 23). The intermediary gear 63 can have teeth 63*b* that contact both the teeth 31*b* of the tilt shaft gear 31 and one or more teeth 33*b* of the control gear 33. The intermediary gear 63 can have a central aperture 63*a* that receives a post or axle connected to the housing 20 about which the intermediary gear 63 rotates in response to rotation of the control gear 33*b* to drive rotation of the tilt shaft gear 31 via rotation of the control gear effected via rotation of the wand connector 35 coupled to the tilt wand 41 as discussed herein. The axis of rotation of the intermediate gear 63 can be positioned lower than the tilt shaft gear 31 so that the intermediate gear is closer to a floor or bottom of the first rail 2 than the tilt shaft gear's axis of rotation. Alternatively, the intermediary gear 63 can have an axis of rotation that is at a same height or a higher height than the axis of rotation of the tilt shaft gear 31. In some embodiments, the axis of rotation of the intermediary gear may extend perpendicular or transverse to the axis of rotation of the tilt shaft gear 31.

In some embodiments, the tilt mechanism and first rail can be configured so that the tilt mechanism can be positioned in the first rail and there is a hole in the front wall and/or bottom floor of the first rail to receive the wand connector 35. The first rail and tilt mechanism provided therein can be configured so that the wand connector 35 is decoupled from the control gear when the window covering is in an uninstalled state. The wand connector 35 can be provided within a package containing the first rail and tilt mechanism as a separate element or as a separate element that is coupled to a tilt wand 41 for shipping of the package. When a customer receives the package, they may insert the wand connector through the hole in the first rail 2 and into a hole in the housing 20 of the tilt mechanism 21 positioned in the first rail 2 to couple the wand connector 35 to the control gear 33 via the prongs 33*c*, central projection 33*d*, hole 35*d* and protrusions 35*e*. The tilt wand 41 may then be connected to the wand connector 35. Alternatively, the tilt wand 41 can be connected to the wand connector 35 prior to the coupling of the wand connector 35 to the control gear 33 via the holes in the first rail 2 and the housing 20 of the tilt mechanism.

In yet other embodiments, the tilt mechanism 21 can be provided in the first rail 2 such that the wand connector 35 is already coupled to the control gear 33. For such embodiments, the tilt wand 41 can be shipped in the same package as the first rail 2 having the tilt mechanism 21 so that the tilt wand is separated from the first rail 2 and the tilt mechanism 21 for shipping of these items in the same package. As can be appreciated from the method shown in FIG. 7, the slats can be connected to the first rail and/or a tilt shaft 23 in the first rail for such shipping so that a window covering is included in the package. Alternatively, a fabricator customer may couple the tilt shaft and/or slats to the first rail after receiving the package.

It should be understood that different embodiments of my window covering may include different elements to meet different sets of design criteria. For instance, the lift cord control mechanism 11 can be configured as a loop cord drive that has a looped cord operator cord, a cord lock having the lift cords pass therethrough, a cord lock having an operator cord coupled to the lift cords pass that pass through the cord lock, a spring motor unit coupled to the lift cords, an electric motor unit coupled to the lift cords, or other type of mechanism for lifting and lowering the window covering material of the window covering. The lift cords could be cords, cord segments of the same cord, polymeric filaments, tape, or other type of flexible elongated members. The slats can be positioned on rope ladders, cord ladders, tape ladders, or other type of venetian blind slat ladder mechanism. The tilt shaft 23 can be structured as a rod, bar, arm, or other type of elongated member positioned in a rail that is rotatable in opposite directions (e.g. clockwise and counterclockwise). As yet another example, some embodiments of the window covering may not utilize a bottom rail or may be configured as a top down bottom up shade having a headrail, bottom rail, and a middle rail that is between the headrail and bottom rail that is moveable relative to the headrail and the bottom rail via a middle rail positional control mechanism (e.g. a spring motor unit or cord lock, etc.). The slats of the window covering can be polymeric slats, wooden slats, bamboo slats, fabric slats, or slats of another type of material or structure. Thus, while certain exemplary embodiments of window covering 1, tilt mechanism 21, and methods of making and using the same have been shown and described above, it is to be distinctly understood that the invention is not limited thereto but may be otherwise variously embodied and practiced within the scope of the following claims.

What is claimed is:

1. A method of providing a window covering, comprising:

providing a tilt mechanism that is positionable in a first rail of the window covering, the tilt mechanism comprising:

a tilt shaft gear having an aperture, a portion of a tilt shaft being passable through the tilt shaft gear via the aperture of the tilt shaft gear such that rotation of the tilt shaft gear causes the tilt shaft to rotate when the tilt shaft is within the aperture;

a control gear positioned adjacent the tilt shaft gear such that rotation of the control gear causes the tilt shaft gear to rotate, an upper end of the control gear having at least one tooth, a lower end of the control gear being opposite the upper end of the control gear, the lower end of the control gear defining a coupling mechanism having a plurality of prongs that extend around a central projection;

a wand connector having an upper end and a lower end opposite the upper end, the upper end of the wand connector having a hole in communication with a channel defined in a body of the wand connector such that the central projection is insertable into the wand connector via the hole and the channel; a plurality of protrusions extending from the body of the wand connector around a periphery of the body of the wand connector, each one of the protrusions configured to have an upper surface configured to contact a respective one of the prongs to resiliently move the prongs away from the central projection as the central projection is inserted into the body of the wand connector, wherein the respective upper surface of each one of the protrusions extends linearly away from the body of the wand connector so that the protrusions guide the prongs away from the central projection when the prongs are moved along the protrusions each one of the protrusions have a bottom surface configured to contact a portion of the respective one of the prongs after a distal end of the respective prong passes over the upper surface of each one of the protrusions to interlock with an upper flat portion of the respective prong;

passing the central projection into the hole of the upper end of the wand connector to insert the central projection into the channel;

causing the prongs to engage the protrusions to resiliently move the prongs away from the central projection;

interlocking the respective bottom surfaces of the protrusions with upper surfaces of the respective distal ends of the prongs after the prongs are passed lowest ends of the the respective upper surfaces of the protrusions to affix the wand connector to the control gear.

2. The method of claim 1, wherein the coupling mechanism of the control gear is configured so that after the coupling mechanism is attached to the wand connector via the central projection being positioned within the body of the wand connector and the prongs interlock with the respective bottom surfaces of the protrusions to affix the wand connector to the control gear, at least one of the prongs must be fractured to separate the control gear from the wand connector.

3. The method of claim 1, comprising:

shipping the tilt mechanism to a customer.

4. The method of claim 1, comprising:

positioning at least a portion of the tilt mechanism within the first rail of the window covering;

passing the portion of the tilt shaft through the aperture of the tilt shaft gear;

positioning a lift cord control mechanism in the first rail;

connecting at least one lift cord to the lift cord control mechanism.

5. The method of claim 4, comprising:

connecting upper ends of rails of ladders to the tilt shaft.

6. The method of claim 5, wherein the ladders have rungs that retain slats, the method comprising:

passing each lift cord through or adjacent the slats.

7. The method of claim 6, providing a tilt wand with the window covering that is connectable to the lower end of the wand connector such that rotation of the tilt wand causes the tilt shaft to rotate.

8. The method of claim 7, comprising:

placing the tilt wand and the window covering in a package such that the wand connector is coupled to the tilt wand or the tilt wand and the wand connector are each separate from the control gear and are separately positioned in the package; and shipping the window covering with the tilt wand such that the tilt wand is separate from the wand connector when in the package.

9. The method of claim 4, wherein the lift cord control mechanism is a motor, a spring motor, a cord lock, or a loop cord drive.

10. The method of claim 1, comprising:

providing a tilt wand with the window covering that is connectable to the lower end of the wand connector such that rotation of the tilt wand causes the tilt shaft to rotate.

11. The method of claim 10, comprising:

placing the tilt wand and the window covering in a package such the tilt wand and wand connector are each separate from each other and are separately positioned in the package; and shipping the window covering with the tilt wand such that the tilt wand is separate from the wand connector when in the package.

12. The method of claim 10, comprising:

placing the tilt wand and the window covering in a package such that the wand connector is coupled to the tilt wand.

13. The method of claim 12, wherein the placing is performed such that the tilt wand and the wand connector are separate from the control gear.

14. The method of claim 13, comprising:

shipping the package.

15. The method of claim 1, wherein the prongs and the protrusions are configured so that the respective upper flat portions of the prongs engage the respective bottom surfaces of the protrusions to lock the wand connector to the control gear.

16. The method of claim 15, wherein the upper surface of each of the protrusions extends linearly away from the body of the wand connector so the protrusions guide the prongs away from the central projection when the prongs are moved along the protrusions, the prongs resiliently moving away from the central projection when the prongs move along the protrusions.

17. The method of claim 1, wherein the upper surface of each of the protrusions extends linearly away from the body of the wand connector so the protrusions guide the prongs away from the central projection when the prongs are moved along the protrusions, the prongs resiliently moving away from the central projection when the prongs move along the protrusions.

18. The method of claim 1, wherein at least one intermediary gear is positioned between the tilt shaft gear and the control gear.

19. The method of claim 1, wherein the distal end of each of the respective prongs is generally triangularly shaped and has a linearly extending protrusion contacting surface that extends from the respective upper flat portion of the respective prong to a respective lower distal-most portion of the respective prong, the linearly extending smooth protrusion contacting surface configured to contact the respective upper surface when the respective prong is passed over the respective upper surface.

20. The method of claim 19, wherein the central projection is triangular shaped and the hole in communication with the channel defined in the body of the wand connector being triangularly shaped.

* * * * *